United States Patent
Brooks et al.

(10) Patent No.: US 7,721,133 B2
(45) Date of Patent: May 18, 2010

(54) SYSTEMS AND METHODS OF SYNCHRONIZING REFERENCE FREQUENCIES

(75) Inventors: Robert J Brooks, Fort Collins, CO (US); Robert J. Blakely, Fort Collins, CO (US); Karl J. Bois, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 902 days.

(21) Appl. No.: 11/412,384

(22) Filed: Apr. 27, 2006

(65) Prior Publication Data

US 2007/0255971 A1   Nov. 1, 2007

(51) Int. Cl.
*G06F 1/12* (2006.01)
*H03L 7/00* (2006.01)

(52) U.S. Cl. .............. 713/400; 713/500; 713/503; 713/600; 331/16; 331/17; 331/25; 331/34; 327/3

(58) Field of Classification Search ............ 714/100; 713/400, 500, 503, 600; 331/16, 17, 25, 331/34; 327/3

See application file for complete search history.

(56) References Cited

U.S. PATENT DOCUMENTS

| | | | |
|---|---|---|---|
| 4,040,728 A | | 8/1977 | Seidel |
| 4,598,257 A | * | 7/1986 | Southard ............... 331/2 |
| 4,667,328 A | * | 5/1987 | Imran ................. 714/814 |
| 5,146,585 A | * | 9/1992 | Smith, III ............. 713/400 |
| 5,249,206 A | * | 9/1993 | Appelbaum et al. ...... 375/356 |
| 5,485,164 A | | 1/1996 | Compton et al. |
| 5,742,799 A | * | 4/1998 | Alexander et al. ....... 713/401 |
| 5,991,844 A | * | 11/1999 | Khosrowpour ......... 710/312 |
| 6,144,675 A | * | 11/2000 | Wakabayashi et al. ... 370/516 |
| 6,516,422 B1 | * | 2/2003 | Doblar et al. ............ 713/503 |
| 6,631,483 B1 | * | 10/2003 | Parrish ................... 714/55 |
| 6,880,400 B1 | | 4/2005 | Fogliatti et al. |
| 2006/0059270 A1 | * | 3/2006 | Pleasant et al. .......... 709/237 |

* cited by examiner

*Primary Examiner*—Mark Connolly

(57) ABSTRACT

System and methods of synchronizing reference frequencies are disclosed. In an exemplary implementation, a method may comprise providing separate reference frequencies for each of a plurality of operational components. The method may also comprise connecting the separate reference frequencies to one another in a modular, fault-tolerant circuit topology. The method may also comprise synchronizing the separate reference frequencies so that each of the operational components operate at the same frequency.

18 Claims, 5 Drawing Sheets

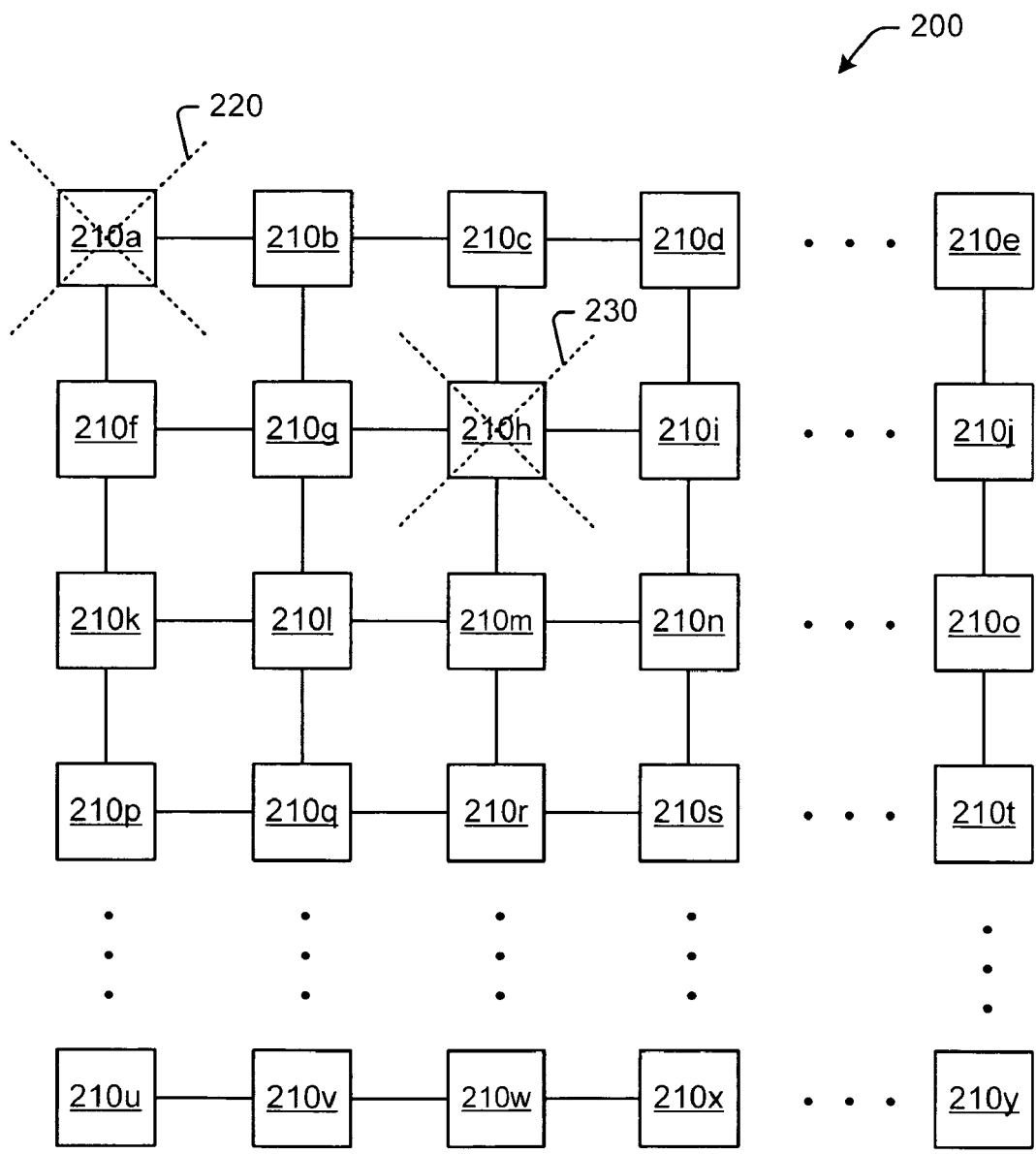

SYSTEMS AND METHODS OF SYNCHRONIZING REFERENCE FREQUENCIES

BACKGROUND

Multi-component computer systems often require that each component be operating at the same frequency. Even very small tolerances may be unacceptable. For example, the operating system in a multi-processor computer system may require that each processor be operating at the same frequency so that the operating system can expect processes to complete at the same time regardless of which processor is executing the process.

A single clock is typically implemented as a universal reference for all of the components in a multi-component computer system, and the clock signal is distributed to each of the components in the multi-component system. However, this architecture necessarily has a single point of failure (i.e., the single clock), which may result in a system-wide failure.

BRIEF DESCRIPTION OF THE DRAWINGS

FIG. 2 is a high-level diagram of an exemplary circuit topology for synchronizing reference frequencies.

DETAILED DESCRIPTION

Systems and methods of synchronizing reference frequencies are disclosed. Exemplary embodiments include multiple reference cells (e.g., oscillators or oscillator circuits), one for each operational component of a multi-component system, with each reference cell coupled to at least another reference cell. If each of the reference cells maintains the same frequency, the signals on both sides are the same and no current flows between the reference cells. This is a favored minimal-energy configuration that the reference cells tend toward. If, however, there is a momentary difference in the signals, energy is caused to flow through the circuit which tends to realign the signals. If a reference cell fails, the other reference cell(s) continue to operate, preventing a system-wide failure. If one or more of the reference cells needs to be taken offline (e.g., and replaced), the other reference cells continue to operate. Accordingly, the system may be modular and fault tolerant.

Figure 1:
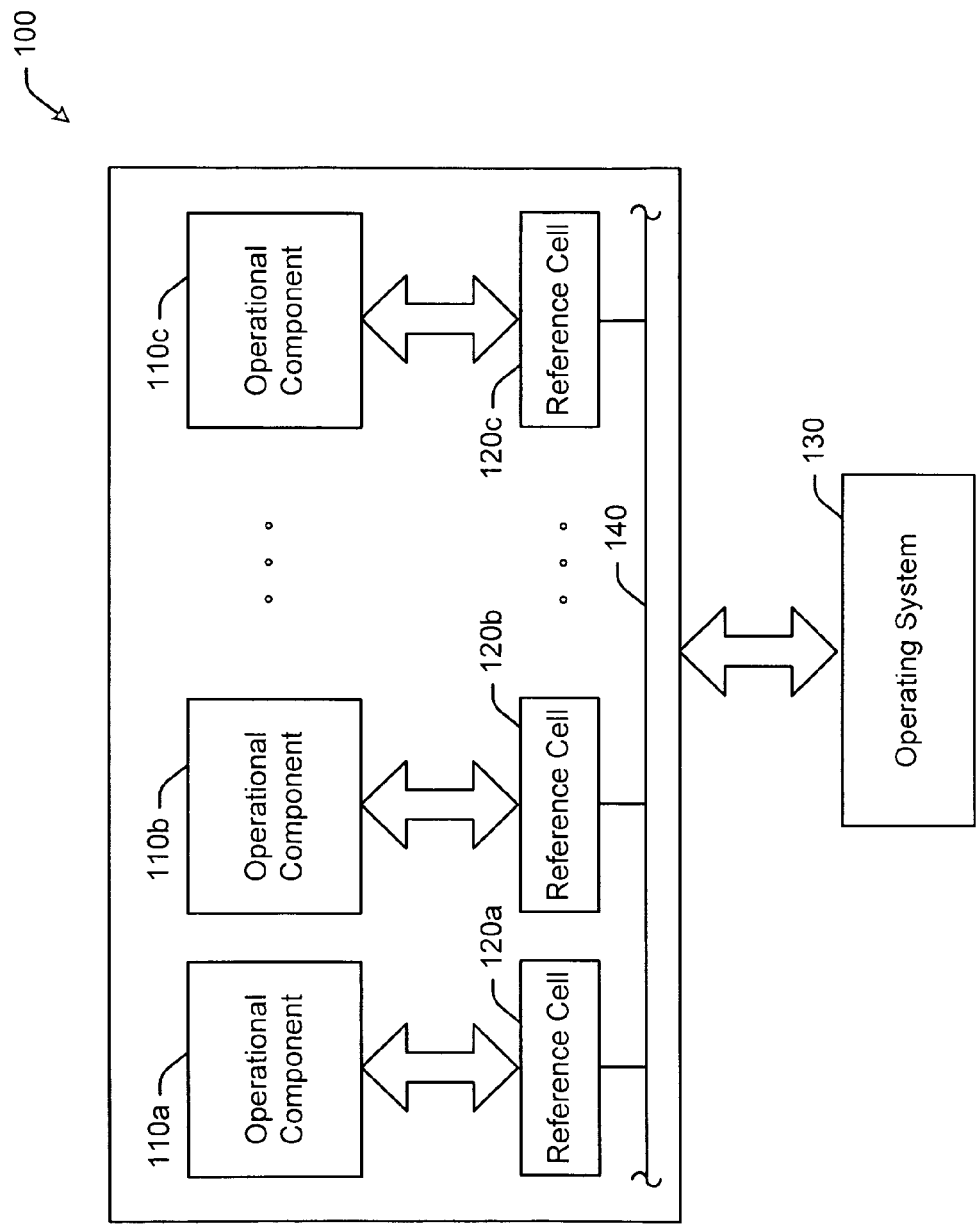
FIG. 1 is a simplified block diagram of an exemplary multi-component computer system which may implement synchronizing reference frequencies.

FIG. 1 is a simplified block diagram of an exemplary multi-component computer system 100 which may implement synchronizing reference frequencies. Multi-component computer system 100 may include one or more operational components 110a-c which are to operate at the same frequency and/or in phase with one another. Reference cells 120a-c are coupled to the operational components 110a-c and provide a frequency reference.

In an exemplary embodiment, computer system 100 is a multi-processor computer system, and the operational components 110a-c are processors or processing units. The operating system 130 may require that some or all of the processors operate at the same frequency and/or in phase with one another. It is noted, however, that the embodiments described herein are not limited to use with multi-processor systems. In other exemplary embodiments, the operational components 110a-c may be memory or memory units, input/output (IO) systems or subsystems, switching elements or crossbars, to name only a few examples of other operational components which may implement synchronizing reference frequencies.

Exemplary reference cells 120a-c may be implemented as quartz crystal oscillators. Quartz crystal oscillators control the frequency of an oscillator circuit causing it to vibrate at a frequency that depends at least to some extent on physical characteristics of the crystal (e.g., cut and thickness). The systems and methods described herein, however, are not limited to use with quartz crystal oscillators. In other exemplary embodiments other types of reference cells, including, e.g., mechanical, electrical, acoustic, and/or opto-electrical oscillators, may be implemented to provide a reference frequency.

It is also noted that the computer system 100 may include any number of operational components 110a-c and/or reference cells 120a-c. In addition, more than one reference cell may be provided for each operational component. By way of example, a backup reference cell may be provided for one or more of the operational components 110a-c so that if one of the reference cells fails, the backup reference cell may continue providing a reference frequency for the operational component(s) 110a-c. In other embodiments, one reference cell may be used to provide a reference frequency to more than one operational component.

In an exemplary embodiment, the reference cells 120a-c may be coupled to one another via a passive network. Passive networks are generally considered more reliable than active networks, thereby reducing the introduction of failures. Exemplary passive networks include wires and/or resistive/capacitive/inductive (RCL) circuits. The passive network may be designed with bandpass characteristics that reduce susceptibility of the circuit to noise and jitter. In other embodiments, however, the reference cells 120a-c may be coupled to one another directly or via an active network.

Although the reference cells 120a-c are shown in FIG. 1 interconnected to one another via a bus 140, other configurations for interconnecting the reference cells 120a-c to one another are also contemplated. An exemplary circuit topology is illustrated in FIG. 2.

FIG. 2 is a high-level diagram of an exemplary circuit topology 200 for synchronizing reference frequencies. In this embodiment, reference cells 210a-y (generally referred to as reference cells 210 unless referring to a specific reference cell) are configured as a fault-tolerant, modular grid with each reference cell 210 interconnected to at least one other reference cell 210.

Each reference cell 210 synchronizes to the other reference cell(s) 210 via the interconnection, as explained in more detail below with reference to FIGS. 3a-c. By way of example, reference cell 210a synchronizes with reference cells 210b and 210f. If one or more of the reference cells 210 were to fail (or is otherwise taken offline), the other reference cells 210 would continue to synchronize with one another. For example, if reference cell 210a fails as illustrated by the "X" mark 220 in FIG. 2, reference cell 210f continues to synchronize with the system via reference cells 210k, 210g, and reference cell 210b continues to synchronize with the system via reference cells 210g, 210c. As another example, if reference cell 210h fails as illustrated by the "X" mark 230 in FIG. 2, the surrounding reference cells 210c, 210g, 210i, and 210m continue to synchronize with adjacent reference cells (e.g., reference cell 210c continues to synchronize with reference cells 210b and 210d, and so forth). Accordingly, the failure (or removal) of any particular reference cell(s) 210 does not result in a system-wide failure.

It is noted that the interconnection of reference cells 210 is not limited to a two-dimensional grid topology as shown in FIG. 2. Multi-dimensional grids, busses, and other circuit topologies are also contemplated, as will be readily apparent to those having ordinary skill in the art after becoming familiar with the teachings herein.

Figure 3A:
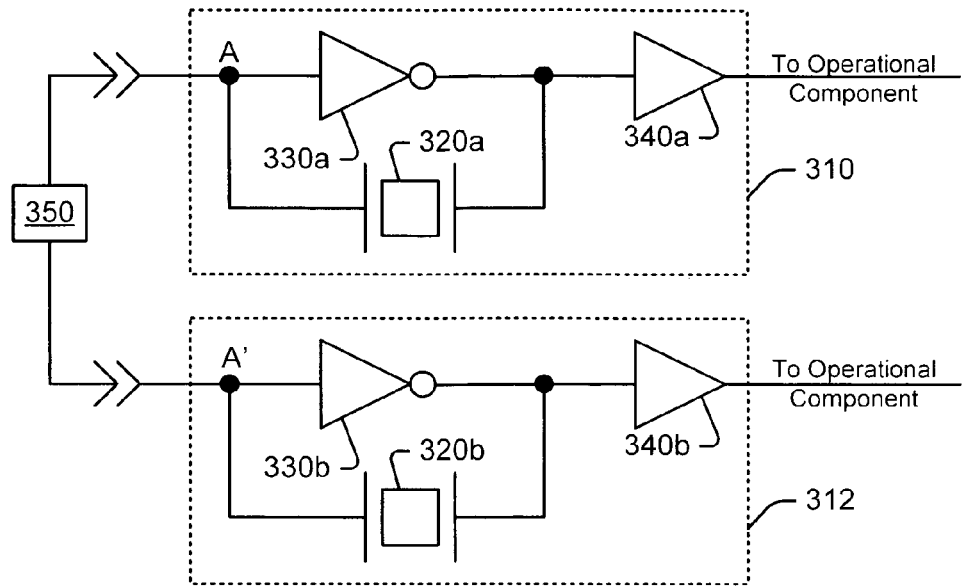
FIGS. 3(a)-(c) are circuit diagrams illustrating exemplary circuit implementations for synchronizing reference frequencies.
Figure 3B:
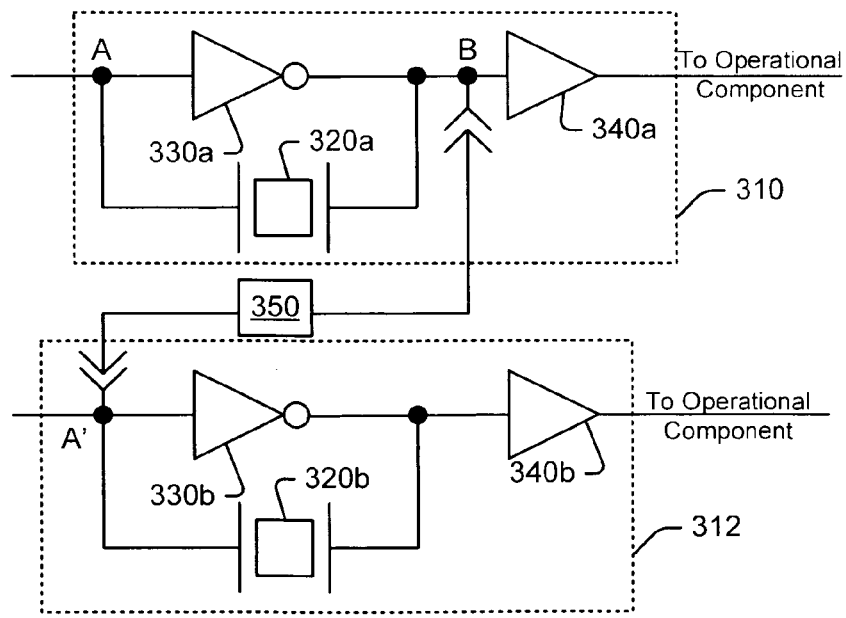
Figure 3C:
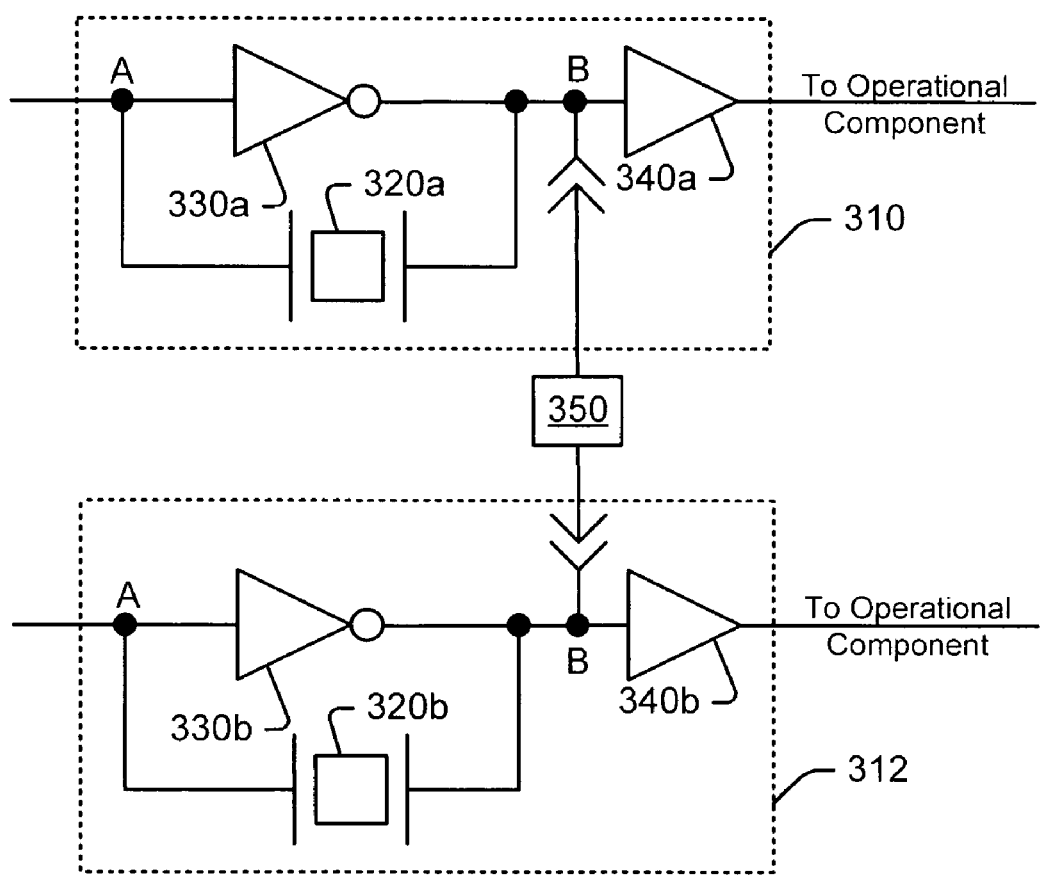

FIGS. 3a-c are circuit diagrams 300a-c illustrating exemplary circuit implementations for synchronizing reference frequencies. In each of the circuit diagrams 300a-c, reference cells 310 and 312 are shown interconnected to one another to illustrate different circuit implementations for synchronizing the reference frequencies. In FIG. 3a, reference cells 310 and 312 are shown interconnected between nodes A and A', respectively. In FIG. 3b, reference cells 310 and 312 are shown interconnected between output node B via an output to input connection to node A'. In FIG. 3c, reference cells 310 and 312 are shown interconnected between output nodes B and B'. These interconnections are shown for purposes of illustration and are not intended to be limiting.

Each reference cells 310 and 312 includes a quartz crystal oscillator 320a and 320b connected in parallel with an inverter 330a and 330b to an output buffer 340a and 340b, respectively. Output buffer 340a, 340b isolates the oscillator 320a, 320b from the operational component (not shown in FIGS. 3a-c) that the reference cells 310, 312 are connected to so that output from the operational component does not affect operation of the oscillator 320a, 320b.

In an exemplary embodiment, the reference cells 310 and 312 are interconnected such that the signal of one of the oscillators (e.g., oscillator 320a) is provided to one or more neighboring oscillators (e.g., oscillator 320b) and vice versa. For example, the input and/or output signal of one of the oscillators may be provided to the input and/or output of the neighboring oscillators, depending on the circuit implementation (e.g., as illustrated in FIGS. 3a-c). Such an interconnection may be implemented system-wide as illustrated by the grid topology discussed above with reference to FIG. 2.

The signals from the oscillators are coupled to the other oscillators, e.g., such as shown by the exemplary circuit implementations illustrated in FIGS. 3a-c. In an exemplary embodiment, the output signal of one oscillator is the same phase as the input signal to another oscillator, and is, upon arrival at the destination node, the same amplitude. Therefore, if oscillator 320a and its neighbor, oscillator 320b, are all oscillating at the same frequency, the output signals for both oscillators 320a, 320b are the same and no current flows between the reference cells 310, 312. This is a favored minimal-energy configuration that the two reference cells 310, 312 tend toward during operation. Any momentary difference in the signals causes an energy flow which tends to automatically realign the output signals of the oscillators with one another.

Since the interconnection between two reference cells is both an output of a driving stage and an input of a receiving stage, a passive network 350 may be symmetric and bridge the nodes of adjacent reference cells 310, 312. The term passive network in the electronics arts generally refers to any connection including a wire, a capacitor, a resistor, an inductor, or any combination of these. In addition, the circuits, such as those illustrated in FIGS. 3a-c, also tend to phase align the output signals from each of the reference cells 310, 312 so that such implementations may also be used to automatically-phase align the operational components.

It is noted that although only two reference cells 310, 312 are shown for purposes of simplicity in FIGS. 3a-c, any number of reference cells may be interconnected to one another. It is also noted that the interconnections shown in FIGS. 3a-c are single-wire passive networks, wherein a single wire interconnects the reference cells 310, 312. In other embodiments, however, the interconnections may be two-wire or other multi-wire passive network configurations. For example, the output of each of the oscillators may be connected to the input paths of each of the other oscillators, e.g., for redundancy. In addition, other electronics may also be provided as part of the reference cells 310, 312. For example, a phase locked loop (PLL) may control the oscillator so that it maintains a constant phase angle on the frequency of the reference signal (i.e., locking on a specific frequency).

Figure 4:
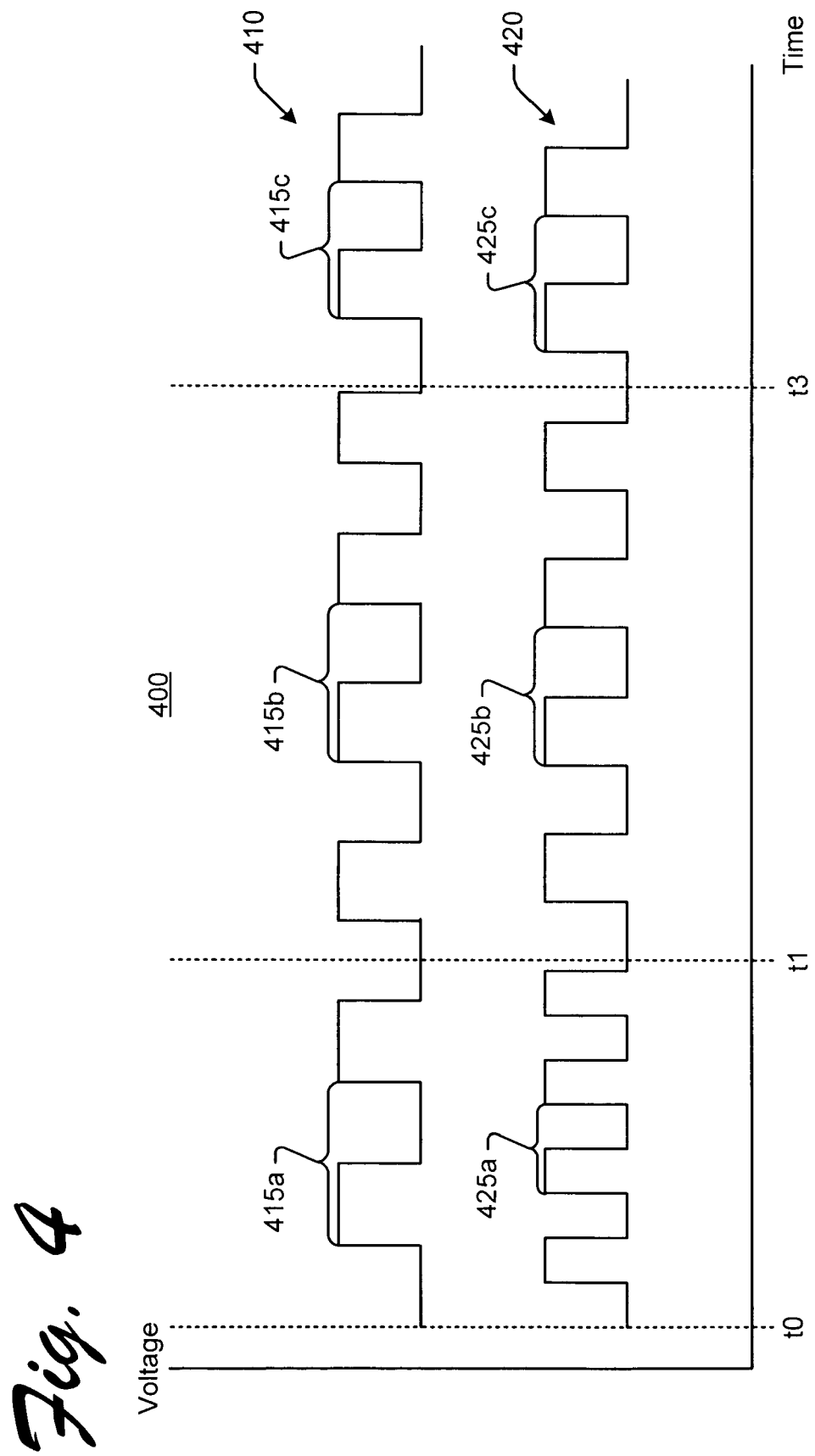
FIG. 4 is a timing diagram illustrating exemplary methods for synchronizing reference frequencies.

FIG. 4 is a timing diagram 400 illustrating exemplary methods for synchronizing reference frequencies. In this example, output signal voltage is shown for two interconnected reference cells (e.g., as illustrated in FIGS. 3a-c) as a function of time. Signal trace 410 represents output from one of the reference cells, and signal trace 420 represents output from the other reference cell.

It is observed during time t0 to t1 that the period 415a of signal trace 410 is longer than the period 425a of signal trace 420, and hence the reference cells are not synchronized. Synchronizing may occur during time t1 to t2, wherein output from the reference cells is observed to be "averaging" relative to one another. That is, the period 415b of signal trace 410 becomes shorter (e.g., relative to the period 415a) and the period 425b of signal trace 420 becomes longer (e.g., relative to the period 425a). After time t3, output from the reference cells is synchronized. That is, the period 415c of signal trace 410 is observed to be the same as period 425c of signal trace 420.

Although timing diagram 400 only illustrates synchronizing the reference cells with regard to frequency, it is understood that output from the reference cells may also be synchronized with regard to phase. If the output is synchronized with regard to phase, the signal traces 410 and 420 are observed to be in-phase (or aligned) with one another after time t3.

The exemplary embodiments shown and described are provided for purposes of illustration and are not intended to be limiting. Still other embodiments are also contemplated for synchronizing reference frequencies.

The invention claimed is:

1. A computer system comprising:
   a plurality of operational components each having to operate at the same frequency;
   a plurality of reference cells, each reference cell coupled to at least one of the operational components for providing a reference frequency; and
   a passive network connecting at least one of the reference cells to another of the reference cells such that energy transfer between the plurality of reference cells synchronizes the reference frequency of one another.

2. The computer system of claim 1, further comprising a backup reference cell connected to at least another of the plurality of reference cells.

3. The computer system of claim 1, wherein the reference cells are coupled in a modular grid topology.

4. The computer system of claim 1, wherein the reference cells are coupled in a fault-tolerant grid topology.

5. The computer system of claim 1, wherein the operational components are processing units in a multi-processor computer system.

6. The computer system of claim 1, wherein the passive network includes a bandpass filter.

7. The computer system of claim 1, wherein the passive network is a single-wire network.

8. The computer system of claim 1, wherein the passive network is a multi-wire network.

9. The computer system of claim 1, wherein an output signal from at least one of the reference cells is coupled to the input path of at least another of the reference cells.

10. The computer system of claim 1, wherein the output signals from the reference cells are the same and minimal current flows between the reference cells if the reference cells are synchronized.

11. The computer system of claim 1, wherein energy flows through the reference cells and realigns the frequency of the reference cells.

12. A method comprising:
providing separate reference signals having a frequency for each of a plurality of operational components;
connecting the separate reference frequencies to one another in a modular, fault-tolerant circuit topology via a passive network; and
synchronizing the separate reference frequencies so that each of the operational components operate at the same frequency.

13. The method of claim 12, further comprising phase-aligning the separate reference frequencies with one another.

14. The method of claim 12, further comprising synchronizing a new reference frequency with the separate reference frequencies when the new reference frequency is brought online.

15. The method of claim 12, wherein connecting the separate reference frequencies to one another is via a bandpass filter.

16. The method of claim 12, further comprising coupling the output of one of the separate reference frequencies to the input path of another of the separate reference frequencies.

17. A computer system comprising:
means for connecting individual reference cells to a plurality of operational components via a passive network; and
means for automatically synchronizing the individual reference cells with one another so that each of the plurality of operational components operate at the same frequency.

18. The computer system of claim 17, further comprising means for automatically phase-aligning the individual reference cells.

* * * * *